United States Patent [19]

Nakayama et al.

[11] Patent Number: 4,815,059
[45] Date of Patent: Mar. 21, 1989

[54] TEMPERATURE-COMPENSATED OPTICAL PICK-UP DEVICE

[75] Inventors: Masahiko Nakayama, Yokohama; Hiroshi Goto, Kawasaki, both of Japan

[73] Assignee: Ricoh Company, Ltd., Tokyo, Japan

[21] Appl. No.: 15,115

[22] Filed: Feb. 17, 1987

[30] Foreign Application Priority Data

Jun. 27, 1986 [JP] Japan .................. 61-151119

[51] Int. Cl.$^4$ .................................................. G11B 7/00
[52] U.S. Cl. ....................................... 369/45; 369/112; 369/122; 350/253
[58] Field of Search ............... 369/44, 45, 112, 121, 369/122; 350/253, 255, 6.3, 6.8; 250/201 DF

[56] References Cited

U.S. PATENT DOCUMENTS

| | | | |
|---|---|---|---|
| 4,005,259 | 1/1977 | Kaneko | 369/122 |
| 4,297,713 | 10/1981 | Ichikawa et al. | 350/6.8 |
| 4,641,023 | 2/1987 | Ando et al. | 350/255 |
| 4,720,168 | 1/1988 | Kaneko | 350/253 |
| 4,721,850 | 1/1988 | Sakai et al. | 369/44 |

FOREIGN PATENT DOCUMENTS

| | | |
|---|---|---|
| 59-15206 | 1/1984 | Japan . |
| 60-107743 | 6/1985 | Japan . |
| 60-205839 | 10/1985 | Japan . |

*Primary Examiner*—Donald McElheny, Jr.
*Attorney, Agent, or Firm*—Cooper & Dunham

[57] ABSTRACT

A semiconductor laser device includes a semiconductor laser for emitting a laser beam, a coupling lens for collimating the laser beam as passing therethrough and a supporting member for supporting the laser and the coupling lens. As the ambient temperature changes, the supporting member either expands or contracts, thereby varying the distance between the laser and the coupling lens. However, it is so structured that the focal distance of the coupling lens varies in accordance with a change in the wavelength of the laser beam emitted from the laser which is caused by the change in the ambient temperature, so that the change in the distance between the laser and the coupling lens is effectively cancelled by the change in the focal distance of the coupling lens, whereby the laser beam passing through the coupling lens remains collimated even if the ambient temperature changes.

17 Claims, 7 Drawing Sheets

AMBIENT TEMPERATURE

Fig.4b

AMBIENT TEMPERATURE

Fig.4c

WAVE LENGTH OF SEMICONDUCTOR LASER

Fig.4d

AMBIENT TEMPERATURE

TEMPERATURE-COMPENSATED OPTICAL PICK-UP DEVICE

BACKGROUND OF THE INVENTION

1. Field of the Invention

This invention generally relates to apparatus for optically recording and/or reproducing information on and/or from an optical disk, and, in particular, to an optical pick-up device for use in such apparatus. More specifically, the present invention relates to an optical pick-up device having a structure which is not adversely affected by fluctuations in the ambient temperature. In addition, the present invention also relates to a semiconductor laser device suitable for use as a light source in such an optical information recording and/or reproducing apparatus.

2. Description of the Prior Art

An optical information recording and/or reproducing apparatus is well known in the art and it generally includes an optical recording medium, typically an optical disk, and an optical pick-up. A relative motion is provided between the optical recording medium and the optical pick-up, whereby information is recorded onto the optical recording medium or recorded information is optically read from the optical recording medium by the optical pick-up. For this purpose, the optical pick-up is typically provided with a light source, such as a semiconductor laser device, from which a laser beam is emitted to be projected onto the recording medium. Typically, the recording medium is in the shape of a disk which is driven to rotate in a predetermined direction and a recording track, either spiral or circular, is previously defined on a recording surface of the disk. Thus, it is required that the light beam emitted from the optical pick-up device be not only properly focused onto the recording medium, but also properly track the recording track of the recording medium.

However, a support member for supporting the semiconductor laser and the optical system, including a coupling lens for collimating the laser beam emitted from the laser, varies its length depending on the ambient temperature, so that the distance between the laser and the coupling lens changes depending on the ambient temperature. On the other hand, the wavelength of the laser beam emitted from the laser also changes depending on the ambient temperature. Accordingly, the focusing condition of the optical pick-up device, in particular that of the coupling lens can be significantly affected by the ambient condition. In this case, there is produced an artificial error in a focus error signal. Several proposals have been made to compensate the variation in distance between the laser and the coupling lens due to thermal expansion of their support member when the ambient temperature changes as disclosed in Japanese Patent Laid-open Publications Nos. 59-15206, 60-107743 and 60-205839. However, these techniques are not satisfactory because none of them takes into consideration the dependency of the wavelength of an emitted laser beam on the ambient temperature.

SUMMARY OF THE INVENTION

In accordance with one aspect of the present invention, there is provided an optical pick-up device which is so structured that a change in distance between a semiconductor laser and a coupling lens substantially corresponds to a change in the focusing distance of the coupling lens due to a change in the wavelength of the laser beam emitted from the semiconductor laser, which is produced by a change in the ambient temperature. With this structure, the laser beam emitted from the laser is received by the coupling lens and the laser beam is collimated properly at all times even if the ambient temperature varies.

In accordance with another aspect of the present invention, there is provided an optical pick-up device which includes a semiconductor laser and a coupling lens for collimating a laser beam received from the laser, whereby the coupling lens is provided with an axial chromatic aberration such that a change in the distance between the laser and the coupling lens substantially cancels a change in the focal distance of the coupling lens due to a change in the wavelength of the laser beam emitted from the laser depending on a change in the ambient temperature.

It is therefore a primary object of the present invention to obviate the disadvantages of the prior art as described above and to provide an improved optical pick-up device having a temperature-compensated focusing condition.

A further object of the present invention is to provide an improved optical pick-up device suitable for use in an optical recording and/or reproducing apparatus, whereby the distance between a semiconductor laser and a coupling lens is properly maintained to have the laser beam emitted from the laser collimated at all times even if the ambient temperature varies.

A still further object of the present invention is to provide a semiconductor laser unit for use in an optical pick-up device, which includes a semiconductor laser and a coupling lens, whereby the coupling lens is provided with a predetermined axial chromatic aberration so as to allow the coupling lens to collimate the laser beam from the laser properly at all times even if the ambient temperature varies.

A still further object of the present invention is to provide an optical pick-up device having a temperature-compensated structure which is not adversely affected by changes in the ambient temperature.

A still further object of the present invention is to provide an improved optical pick-up device high in performance yet simple in structure.

Other objects, advantages and novel features of the present invention will become apparent from the following detailed description of the invention when considered in conjunction with the accompanying drawings.

DESCRIPTION OF THE PREFERRED EMBODIMENTS

Figure 1:
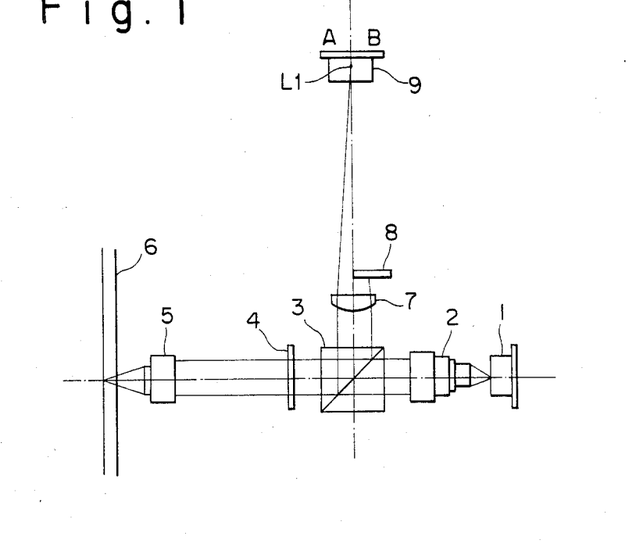
FIG. 1 is a schematic illustration showing an optical pick-up which may be constructed in accordance with one embodiment of the present invention.

Referring now to FIG. 1, there is schematically shown an optical pick-up device suitable for use in an optical recording and/or reproducing apparatus. In general, an optical pick-up device of the illustrated type is provided with a focus error detecting function as well as a tracking error detecting function. As shown, the illustrated optical pick-up device includes a semiconductor laser 1 for emitting a laser beam, a coupling lens 2 located opposite to the laser 1 for receiving the laser beam from the laser 1 and causing it to be collimated, a polarization beam splitter 3, a quarter wavelength plate 4, and an objective lens 5. Thus, the laser beam collimated by the coupling lens 2 passes through the beam splitter 3, quarter wavelength plate 4 and objective lens 5 to be finally focused onto an information recording medium 6, such as an optical disk. Then, the light reflecting from the recording medium 6 again passes the objective lens 5, now in the opposite direction, and its plane of polarization is changed when the reflecting light passes through the quarter wavelength plate 4, so that the reflecting light can be discriminated from the incoming light from the coupling lens 2 at the beam splitter 3.

In other words, in the illustrated embodiment, the reflecting beam is deflected upwardly at right angles by the beam splitter 3, so that the deflected reflecting beam then passes through a focusing lens 7 which is disposed above the beam splitter 3 in the structure shown in FIG. 1. Accordingly, the reflecting light is converted into a convergent light beam by the focusing lens 7, which is partly intercepted by a tracking error detector 8, which, in turn, is typically comprised of a pair of photoelectric elements disposed in a side-by-side arrangement with its line of division in parallel with the recording track of the recording medium 6 opposite to the objective lens 5. It is to be noted that, in the illustrated embodiment, a side edge of the tracking error detector 8, which is located within the light beam, is defined as a knife edge. A differential signal between the pair of photoelectric elements forming the tracking error detector 7 defines a tracking error signal. The remaining portion of the convergent light beam propagates beyond the tracking error detector 8 and finally reaches a focus error detector 9, which typically includes a pair of photoelectric elements A and B located at the focal distance of the focusing lens 7. The pair of photoelectric elements A and B are typically comprised, for example, of PIN photodiodes, and its line of division between the two elements A and B extends normal to the line of division of the pair of photoelectric elements of the tracking error detector 8. A differential signal between the pair of photoelectric elements A and B defines a focusing error signal.

Figure 2A:
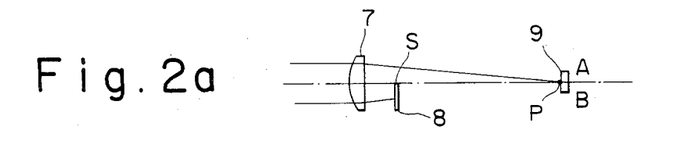
FIGS. 2a through 2c are schematic illustrations which are useful for explaining the focus error detecting function of the structure shown in FIG. 1.
Figure 2B:
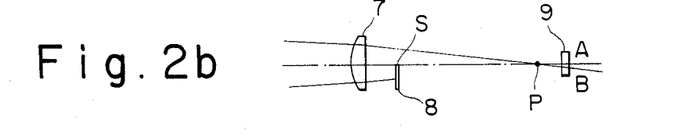
Figure 2C:
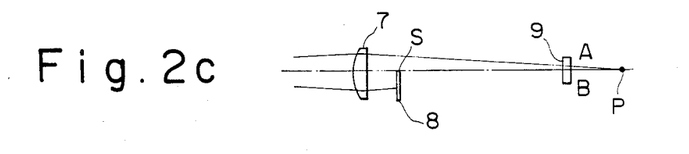

Now, with reference to FIGS. 2a through 2c, the focusing error detecting function of the optical pick-up device shown in FIG. 1 will be described. As described above, the side edge S of the tracking error detector 8 is defined as a knife edge. FIG. 2a shows an in-focus condition between the objective lens 5 and the recording medium 6, in which outputs from the respective photoelectric elements A and B of the focusing error detector 9 are equal and thus a differential signal between these elements A and B is zero. FIG. 2b shows a too-close condition, in which a focusing point P is located in front of the focusing error detector 9, so that an output Pa from the upper photoelectric element A is smaller than an output Pb from the lower photoelectric element B. On the contrary, FIG. 2c shows a too-far condition, in which the focusing point P is located rewardly of the focusing error detector 9 and thus the output Pa from the upper photoelectric element A is larger than output Pb from the lower photoelectric element B. Under the condition, the relative position relation between the objective lens 5 and the recording medium 6 is suitably varied so as to make the outputs Pa and Pb to be equal by a focus servo mechanism (not shown).

Figure 3A:
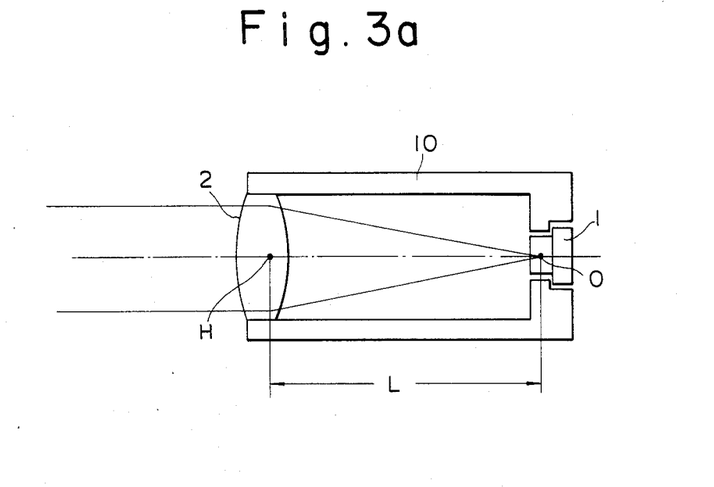
FIGS. 3a and 3b are schematic illustrations which are useful for explaining the principle of one aspect of the present invention.

In the structure of the optical pick-up device shown in FIG. 1, it is to be noted that a housing is also provided to keep the various elements in position, though it is not shown specifically. Besides, a support member 10, defining part of the housing, is also provided to support the semiconductor laser 1 and the coupling lens 2 in a predetermined relative positional relationship as shown in FIG. 3a. Thus, a laser beam emitting point O of the semiconductor laser 1 is located at the focal position L of the coupling lens 2, so that the divergent laser beam emitting from the semiconductor laser 1 becomes collimated when passing through the coupling lens 2. However, when the ambient temperature increases, the support member 10 increases its length due to thermal expansion, so that the distance L between the laser beam emitting point O and the coupling lens 2 increase by the amount of delta L. If this happens, the laser beam does not become properly collimated when it passes through the coupling lens 2 as indicated by the solid line in FIG. 3b. The first aspect of the present invention is directed to obviate this problem by providing a structure in which the laser beam from the laser 1 is always properly collimated even if the distance between the laser 1 and the coupling lens 2 changes due to changes in the ambient temperature.

Figure 3B:
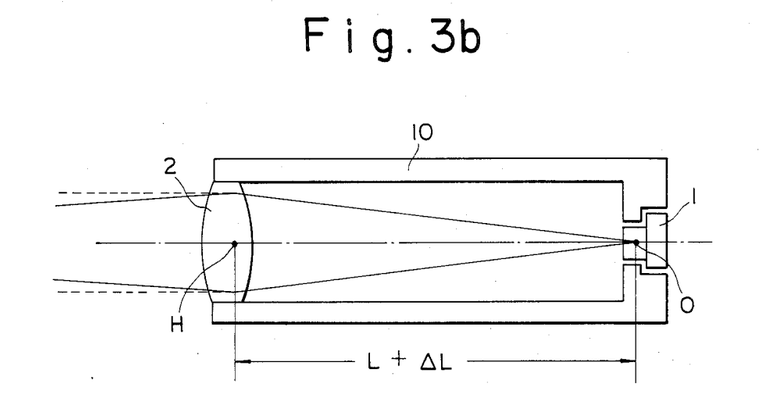
Figure 4A:
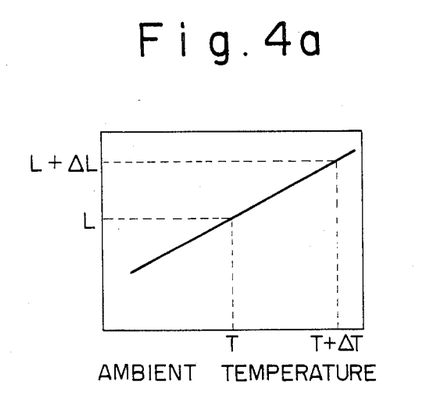
FIGS. 4a through 4d are graphs which are also useful for understanding the principle of one aspect of the present invention.
Figure 4B:
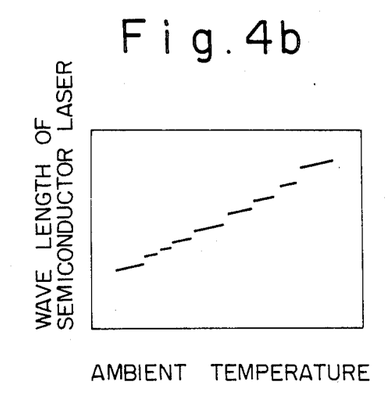
Figure 4C:
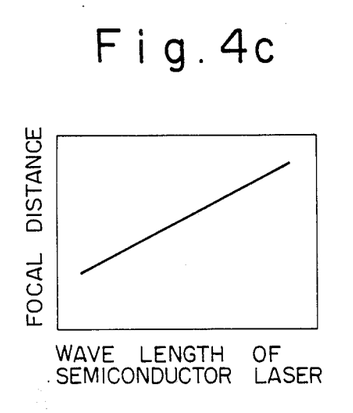
Figure 4D:
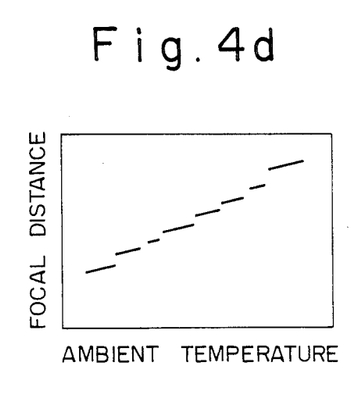

That is, FIG. 3a shows a positional relation between the semiconductor laser 1 and the coupling lens 2, which are supported by the support member 10, with the ambient temperature at T. Under the condition, the distance L between the laser beam emitting point O of the semiconductor laser 1 and the principal point H of the coupling lens 2 is equal to the focal distance of the coupling lens 2. On the other hand, FIG. 3b shows a positional relation between the semiconductor laser 1 and the coupling lens 2 when the ambient temperature becomes T+delta T, whereby the distance between the laser beam emitting point O and the principal point H is changed to L+delta L due to thermal expansion of the support member 10 supporting the laser 1 and the coupling lens 2. This relation between the ambient temperature and the distance between the laser beam emitting point O and the principal point H is graphically shown in FIG. 4a. As graphically shown in FIG. 4b, it is well known that the wavelength of a laser beam emitted from the semiconductor laser 1 varies in accordance with the ambient temperature. Moreover, as shown in FIG. 4c, the focal distance of the coupling lens 2 also varies in accordance with the wavelength of a laser beam emitted from the laser 1. It is to be noted that the slope of the characteristic line shown in the graph of FIG. 4c is determined by a material or a combination of materials, which forms the coupling lens 2. From FIGS. 4b and 4c, a relation between the ambient temperature and the focal distance of the coupling lens 2 can be obtained as graphically shown in FIG. 4d.

From the above, it can be seen that the focal distance of the coupling lens 2 varies in accordance with the ambient temperature, and, moreover, the distance between the laser beam emitting point O of the laser 1 and the principal point H of the coupling lens 2 also varies in accordance with the ambient temperature. Now, in accordance with the principle of this aspect of the present invention, it is so structured that the amount of change in the distance between the laser beam emitting point O of the laser 1 and the principal point H of the coupling lens 2 due to the ambient temperature is equal to or substantially equal to the amount of change of the focal distance of the coupling lens 2 due to the ambient temperature. Put it another way, by designing the coupling lens 2 so as to make the straight line characteristic shown in FIG. 4a in agreement with an approximate straight line for the characteristic shown in FIG. 4d, the focal distance of the coupling lens 2 remains equal to the distance between the laser beam emitting point O of the laser 1 and the principal point H of the coupling lens 2 even if the ambient temperature varies. As a result, the divergent laser beam emitted from the semiconductor laser 1 can be converted into a collimated or parallel laser beam by passing through the coupling lens 2, so that a proper focusing error signal can be detected at all times.

Designation of several parameters will be made as indicated below.

$f_c$: focal distance of coupling lens 2 with the ambient temperature at T,
$f_0$: focal distance of objective lens 5,
L: distance between laser beam emitting point O of the semiconductor laser 1 and the principal point H of the coupling lens 2,
L+delta L: focal distance of coupling lens 2 with the ambient temperature at T+delta T,
beta: linear thermal expansion coefficient of support member 10 supporting laser 1 and coupling lens 2, and
F: focus error.

Using the above designation, the linear thermal expansion coefficient beta of the support member 10 can be expressed in the following manner.

$$\text{beta} = (1/L).(\text{delta } L/\text{delta } T)$$

Thus, the amount of change delta L in the distance between the laser beam emitting point O of the semiconductor laser 1 and the principal point H of the coupling lens 2 due to a change in the ambient temperature may be expressed in the following manner.

$$\text{delta } L = \text{beta}.L.\text{delta } T$$

As described previously, in accordance with this aspect of the present invention, the amount of change delta $f_c$ in the focal distance of the coupling lens 2 due to a change in the ambient temperature should be equal to delta L of the above equation. However, since a certain error is tolerated in this delta $f_c$, such a tolerable error is designated as ±delta C. Thus, the amount of change in the focal distance, i.e., delta $f_c$, can be expressed as follows:

$$\text{delta } f_c = \text{beta}.L.\text{delta } T \pm \text{delta } C.$$

Accordingly, we have $$\pm \text{delta } C = \text{delta } f_c - \text{beta}.L.\text{delta } T.$$

Now, the focus error F can be expressed as follows:

$$F = (\tfrac{1}{2}).(f_c/f_0)^2.\text{delta } C.$$

In general, the focus error F due to variations in the ambient temperature can be tolerated up to a range of $\pm 2.0 \times 10^{-3}$ mm, so that we have the condition that delta C should be smaller than $0.4 \times (f_c/f_0)^2 \times 10^{-3}$ mm. As a result, we have the condition of an absolute value of (delta $f_c$ − beta.L.delta T) being smaller than $0.4 \times (f_c - f_0)^2 \times 10^{-3}$ mm. Accordingly, if use is made of a coupling lens which changes its focal distance by delta $f_c$ when the ambient temperature changes by delta T, thereby satisfying the above equation, there can be obtained a proper focus error signal irrespective of the level of the ambient temperature.

As a specific example, at the ambient temperature T=25° C., given that focal distance of the coupling lens 2, $f_c$=12.0 mm; focal distance of the objective lens 5, $f_0$=4.5 mm; distance between the laser emitting point O of the laser 1 and the principal point H of the coupling lens 2, L=12.0 mm; and linear thermal expansion coefficient of the support member, beta=23. $2 \times 10^{-6}$ mm/°C. Under the condition, if the ambient temperature increases by delta T=20° C., since the absolute value of (delta $f_c$ − beta.L.delta T) should be smaller than $0.4 \times (f_c/f_0)^2 \times 10^{-3}$, with the substitution of the above values in this inequality condition, we have absolute value of (delta $f_c - 23.2 \times 10^{-6} \times 20 \times 12$) being smaller than the value of $0.4 \times (12/4.5)^2 \times 10^{-3}$. After rearrangement, we have the inequality condition of absolute value of (delta $f_c - 5.57 \times 10^{-3}$) being smaller than $2.84 \times 10^{-3}$. As a result, we finally obtain the inequality condition of delta $f_c$ being larger than $2.73 \times 10^{-3}$ mm but smaller than $8.41 \times 10^{-3}$ mm.

Figure 5A:
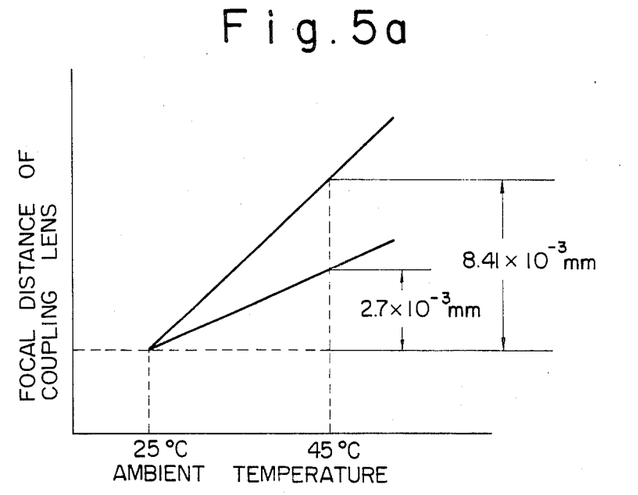
FIGS. 5a and 5b are graphs which are useful for understanding the temperature compensation function of one aspect of the present invention.
Figure 5B:
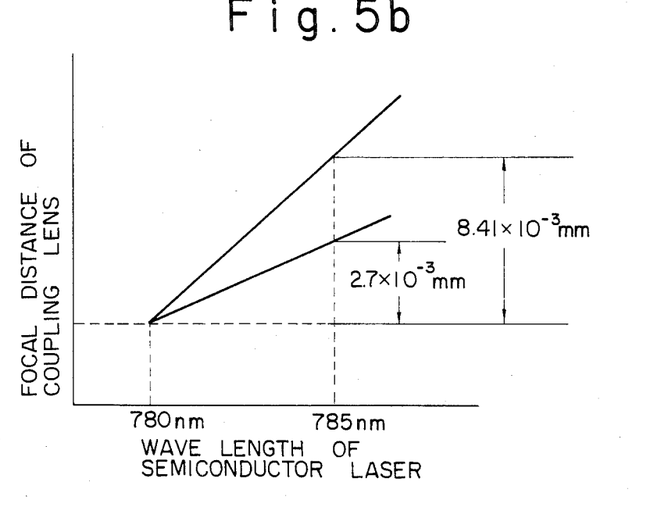

As indicated in FIG. 5a, in accordance with this aspect of the present invention, the designing of the coupling lens 2 should be carried out such that the amount of change in the focal distance of the coupling lens 2 is in a range between $2.73 \times 10^{-3}$ mm and $8.14 \times 10^{-3}$ mm when the ambient temperature increases from the reference temperature T=25° C. by the amount of 20° C. As described previously, the variation of the focal distance of the coupling lens 2 due to the change in the ambient temperature stems from the variation in the wavelength of an emitted laser beam due to the change in the ambient temperature. Accordingly, supposing that the wavelength of a laser beam emitted at the reference ambient temperature (T=25° C.) is 780 nm and the wavelength of a laser beam emitted at the increased ambient temperature (T+delta T=45° C.) is 785 nm, the coupling lens 2 is so designed that its change of focal distance falls into a range between $2.73 \times 10^{-3}$ mm and $8.41 \times 10^{-3}$ mm, as shown in FIG. 5b, from the above equation when the wavelength of a laser beam emitted from the laser 1 changes from 780 nm to 785 nm.

As described above, in accordance with this aspect of the present invention, it is so structured that the amount of change in the focal distance of the coupling lens 2 due to a change in the wavelength of an emitted laser beam, which is caused by a change in the ambient temperature, is made equal to or substantially equal to the amount of change in the distance between the laser 1 and the coupling lens 2, which is brought about by a change in the ambient temperature. Thus, even if the ambient temperature changes, the divergent laser beam emitted from the semiconductor laser 1 is properly collimated at all times by passing through the associated coupling lens 2, so that a proper focusing error signal can be obtained.

Figure 6:
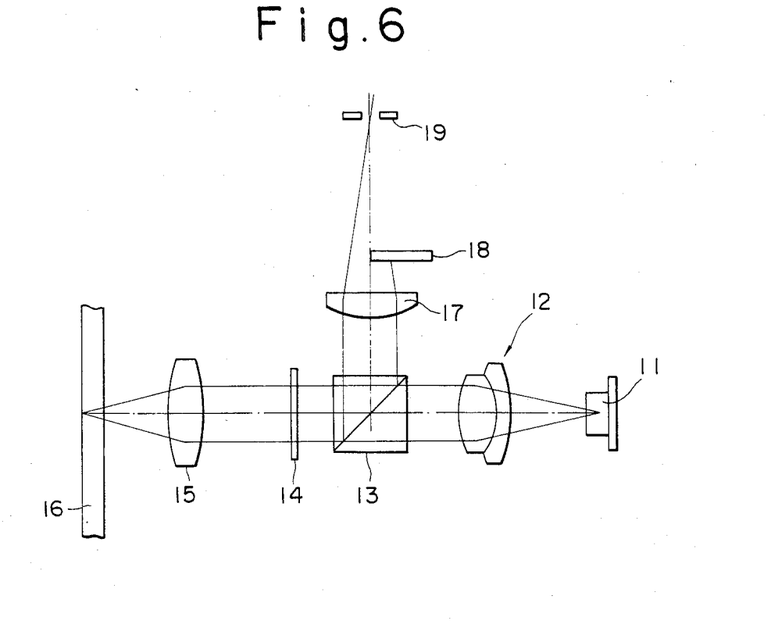
FIG. 6 is a schematic illustration showing an optical pick-up which may be constructed in accordance with another embodiment of the present invention.

Now, another aspect of the present invention will be described. FIG. 6 schematically illustrates an optical pick-up device constructed in accordance with this aspect of the present invention, and the optical pick-up device shown in FIG. 6 is structurally similar in many respects to the optical pick-up device of the previous embodiment shown in FIG. 1. Thus, in FIG. 6, the corresponding elements are indicated by the reference numerals used in FIG. 1 by adding the value 10 and the repetition of description will be thereby eliminated. Thus, the optical pick-up device shown in FIG. 6 includes a semiconductor laser 11, a coupling lens 12, a beam splitter 13, a quarter wavelength plate 14, an objective lens 15, a focusing lens 17, a tracking error detector 18 and a focusing error detector 19. And, what is indicated by reference numeral 16 is a recording medium, typically an optical disk.

Figure 11:
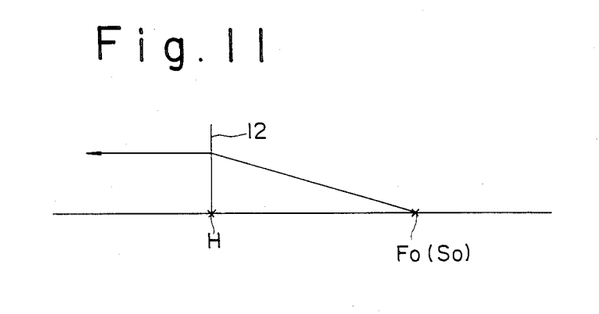
Figure 12:
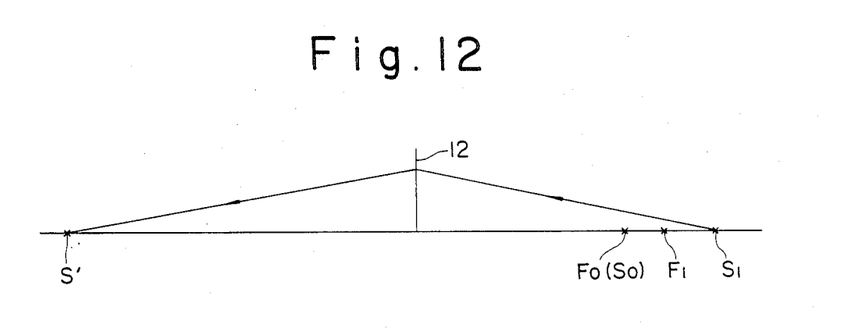

In FIG. 11, the principal point of the coupling lens 12 located at the side of the laser 1 is indicated by H, the laser beam emitting point of the laser 11 at reference ambient temperature $T_0$ is indicated by $S_0$ and the focal point of the coupling lens 12 is indicated by $F_0$. Since focal point $F_0$ agrees in location with laser beam emitting point $S_0$ at the reference ambient temperature $T_0$, the laser beam passing through the coupling lens 12 is collimated as indicated by the arrow, and, thus, the conjugate point of the coupling lens 12 is located at infinity. On the other hand, if the ambient temperature changes from reference temperature $T_0$ to $T_l$, the focal point $F_l$ of the coupling lens 12 is shifted with respect to the focal point $F_0$ at reference ambient temperature $T_0$, as shown in FIG. 12. In addition, the laser beam emitting point $S_l$ of the laser 1 is also shifted in position from the laser beam emitting point $S_0$ at the reference ambient temperature $T_0$.

In this manner, in general, when the ambient temperature varies, there is no agreement between the laser beam emitting point $S_l$ and the focal point $F_l$, so that the laser beam passing through the coupling lens 12 differs in condition from that under the reference ambient condition, so that the laser beam passing through the coupling lens 12 is not collimated any more and there is obtained a conjugate point S' of the laser 1 other than at infinity. With such variation in the condition of the laser beam passing through the coupling lens 12 depending on the ambient temperature, there is produced an error in the focus detecting function of the optical pick-up device, and, in the case of a laser printer application, the size of a beam spot formed on a photosensitive drum varies, thereby causing a deterioration in the quality of a recorded image.

Now, let us consider the effects imposed on the optical pick-up device when the ambient temperature varies. In the structure of the optical pick-up device shown in FIG. 6, the divergent laser beam emitted from the semiconductor laser 11 passes through the associated coupling lens 12, whereby the laser beam is collimated. And, the thus collimated laser beam further passes through the beam splitter 13 and the quarter wavelength plate 14, and then it is focused onto the optical disk 16 by means of the objective lens 15. Then, the reflecting light beam from the optical disk 16 again passes through the objective lens and the quarter wavelength plate 14 this time in the opposite direction and is deflected by the beam splitter 13 toward a detecting optical system which includes the detection or focusing lens 17, the two-component type tracking error detector 18 provided with a knife edge and the two-component type focusing error detector 19, including a pair of photoelectric elements. The focusing error detection is carried out by the so-called knife edge method in the illustrated embodiment.

Figure 7:
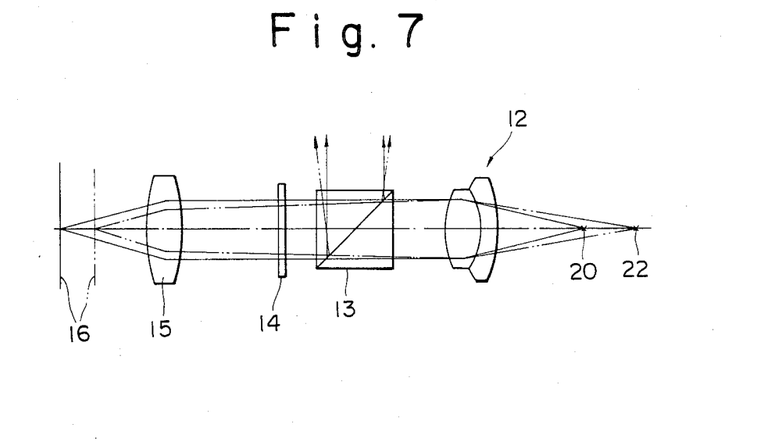
FIG. 7 is a schematic illustration which is useful for understanding how the structure shown in FIG. 6 is affected when the ambient temperature varies.

With this structure, when the ambient temperature is at the reference level, the laser beam emitted from a laser beam emitting point 20 in the semiconductor laser 11 is focused onto the focal point of the objective lens 15, where the optical disk 16 is located, as indicated by the solid line in FIG. 7. In this case, the laser beam deflected by the beam splitter 13 toward the detecting optical system is collimated or parallel as indicated by the solid line in FIG. 7. However, if the ambient temperature deviates from the above-mentioned reference condition, the laser beam emitting point 22 in the laser 11 under the condition is shifted in position from the laser beam emitting point 20 under the reference ambient temperature condition, so that the laser beam passing through the coupling lens 12 is not any more collimated and instead becomes convergent as indicated by the tow-dotted line in FIG. 7. For this reason, in order to obtain a minimum-sized beam spot on the optical disk 16, it is required that the optical disk 16 be shifted from the focal point of the objective lens 15. In addition, the laser beam deflected by the beam splitter 13 towards the detecting optical system also becomes divergent as compared with the reference ambient temperature condition, so that an error tends to be produced in the focus error detecting function.

As described above, when the laser beam passing through the coupling lens 12 varies its condition, such as a wave front, due to changes in the ambient temperature, the beam spot size of a laser beam on a scanning surface or optical disk in an optical recording and/or reproducing apparatus, optical pick-up or laser printer varies, so that there is produced a deterioration or incompleteness in writing or reading of information on or from a recording medium. In the case of optical communication, changes in the shape of wave front themselves cause deteriorations in a signal to be transmitted. This aspect of the present invention is directed to obviate such disadvantages and has its object to provide a semiconductor laser unit wherein the conjugate point of the semiconductor laser is prevented from being shifted from a predetermined position under the reference ambient temperature condition utilizing a change in the wavelength of a laser beam associated with a change in the ambient temperature, a change in the refractive index of the coupling lens associated with this change in wavelength and a thermal variation in the support member which supports the semiconductor laser and the coupling lens.

Described briefly, in accordance with this aspect of the present invention, there is provided a semiconductor laser device which includes a semiconductor laser for emitting a laser beam and a coupling lens for collimating the laser beam from the laser, wherein the coupling lens is so structured to have an axial chromatic aberration which effectively serves to cancel a change in distance between the laser and the coupling lens due to a thermal deformation of the support member supporting the laser and the coupling lens due to a change in the ambient temperature from the reference temperature by a change in wavelength of a laser beam emitted from the laser due to such a temperature change. That is, in accordance with the principle of this aspect of the present invention, there is no need to provide a temperature controlling structure to the semiconductor laser itself and to make the support member, supporting the laser and the coupling lens, not to produce any thermal deformation due to changes in the ambient temperature, which are rather expensive to implement. In this aspect of the present invention, the support member for supporting the laser and the coupling lens can be comprised of a single piece, and a thermal deformation caused by a change in the ambient temperature is utilized and compensated by the axial chromatic aberration characteristic provided by the coupling lens. Thus, the laser beam passing through the coupling lens can be maintained substantially at constant and collimated.

It is to be noted that the fact that the coupling lens is provided with an axial chromatic aberration characteristic indicates that the focal distance of the coupling lens varies in association with changes in the wavelength of a laser beam emitted from the semiconductor laser, which are caused by changes in the ambient temperature.

Figure 10:
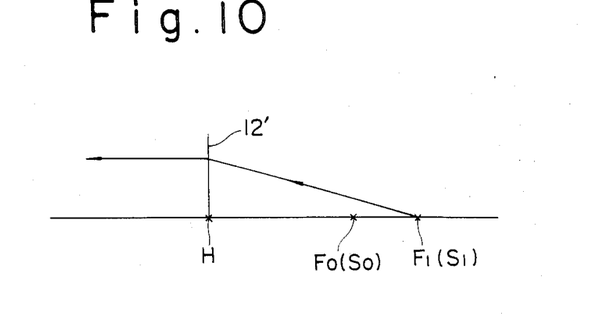
FIGS. 10 through 12 are graphs which are useful for explaining the principle of the structure shown in FIG. 9.

Referring now to FIG. 10, reference numeral 12' indicates a coupling lens provided with an axial chromatic aberration characteristic described above and this should be provided in place of the coupling lens 12 shown in FIGS. 6 and 7 in accordance with this aspect of the present invention. With the use of this coupling lens 12', when the ambient temperature changes from the reference temperature, e.g., 20° C. if the usable temperature range is set between 0° C. and 60° C., the laser beam emitting point shifts from $S_0$ to $S_l$ due to thermal deformation of the support member. However, if the longitudinal chromatic aberration of the coupling lens 12' is set to be appropriately large, the focal distance of the coupling lens 12' also shifts from $F_0$ to $F_l$ along with a change in the wavelength of the laser 11, so that the shifted focal point $F_l$ agrees in position with the shifted laser beam emitting point $S_l$. As a result, irrespective of changes in the ambient temperature, the laser beam passing through the coupling lens 12' is maintained substantially at constant and collimated, thereby allowing to attain the objective of this aspect of the present invention.

Figure 9:
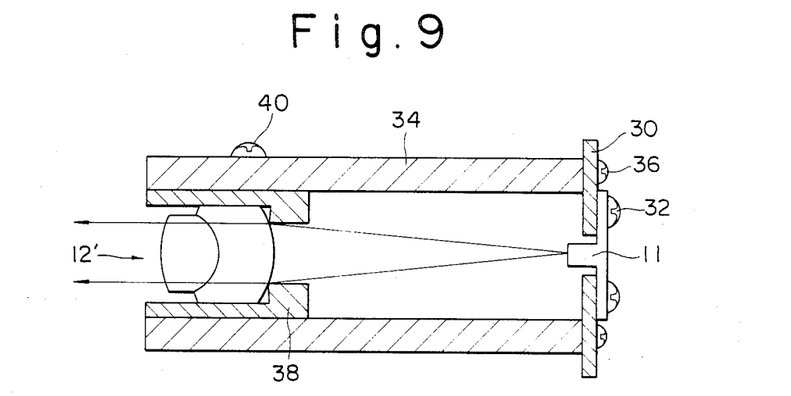
FIG. 9 is a schematic illustration showing a semiconductor laser unit suitable for use in an optical recording and/or reproducing apparatus, which is constructed in accordance with a further embodiment of the present invention.

FIG. 9 schematically shows a semiconductor laser unit constructed in accordance with a particular embodiment of this aspect of the present invention, which is suitable for use in an optical pick-up device or the like. That is, the semiconductor laser 11 is fixedly attached to a holder 30 by means of screws 32. An insulating material, such as Mylar film, is preferably interposed between the semiconductor laser 11 and the holder 30. It is to be noted that the holder 30 is fixedly attached to the end of a support or connection member 34 by means of screws 36 after having the semiconductor laser 11 axially aligned with the optical axis of the coupling lens 12'. In the illustrated embodiment, the coupling lens 12' is a combination of a convex and concave lens, and such a combination is housed in a cell unit 38 which, in turn, is housed in the cylindrical support member 34 located at and fixedly attached by screws 40 to the forward end of the support member 34 which is opposite to the rear end where the laser 11 is located. The support member 34 supports both of the laser 11 and the coupling lens 12' and extends therebetween, and thus the distance between the laser 11 and the coupling lens 12' is affected by thermal deformation, i.e., expansion or contraction, of the support member 34. It is to be noted that the thermal deformation of the holder 30 can be neglected in relation to the thermal deformation of the support member 34, and, thus, the support member 34, which connects or couples the laser 11 to the coupling lens 12', can be regarded as a single piece element.

Now, a comparison will be made between the amount of change in the distance between the laser beam emitting point of a semiconductor laser and a coupling lens and the amount of axial chromatic aberration of the coupling lens due to changes in the wavelength of a laser beam emitted from the semiconductor laser. Here, it will be assumed that the coupling lens is a prior art coupling lens having no axial chromatic aberration as required in this aspect of the present invention. In the first place, it is assumed that the change in the ambient temperature is equal to delta T=30° C. and the support member 34 is comprised of inexpensive Al (whose linear expansion coefficient alpha=$23 \times 10^{-6}$ mm/degree) with the coupling lens having the focal distance f=15 mm. Besides, since the semiconductor laser 11 has a temperature dependency in the wavelength of a laser beam emitted ranging between 0.2 and 0.3 nm/degree, it will be assumed here to be 0.25 nm/degree. Under the condition, the amount of thermal deformation delta 1 of the support member 34 may be calculated as follows:

$$\begin{aligned} \text{delta 1} &= \text{alpha} \cdot f \cdot \text{delta } T \\ &= 23 \times 10^{-6} \times 15 \times 30 \\ &= 10.35 \text{ microns} \end{aligned}$$

Next, it will be supposed that the coupling lens is comprised of a pair of convex and concave lenses having various parameters defined in the following table 1.

TABLE 1

| | | | |
|---|---|---|---|
| convex lens | $r_1 = 9.566$ <br> $r_2 = -6.906$ | $d_1 = 2.0$ <br> $d_2 = 0.0$ | For BK7 glass material <br> nd = 1.51680 <br> vd = 64.2 |
| concave lens | $r_3 = -6.906$ <br> $r_4 = -14.629$ | $d_3 = 2.0$ | For SF11 glass material <br> nd = 1.78472 <br> vd = 25.7 |

Since the wavelength of a laser beam emitted from the semiconductor laser 11 changes by the amount of 7.5 nm for delta T=30 degrees, if the wavelength under the reference temperature condition is lambda$_0$=780 nm, when the ambient temperature changes by the amount of 30 degrees, we have the wavelength lambda$_l$=787.5 nm. Accordingly, the focal distances of the coupling lens at these respective temperatures are $f_{780}=14.9996$ mm and $f_{787.5}=15.0011$ mm. Thus, the change of focal distance delta $f=15.0011-14.9996=1.5$ microns. It can thus be understood that the amount of thermal deformation, delta 1, of the support member 34 is relatively large. Accordingly, in order to compensate for the change of focal distance of the coupling lens resulting from the thermal deformation of the support member 34, it is necessary to increase the axial chromatic aberration of the coupling lens. A specific example in this respect will be described in detail below.

The axial chromatic aberration delta S of a combination lens comprised of two lenses can be expressed by the following equation.

$$-\text{delta } S = S^2 \left( \frac{1}{f(1) \cdot v(1)} + \frac{1}{f(2) \cdot v(2)} \right) \quad (1)$$

Here,
f(1): focal distance of the convex lens at d line;
f(2): focal distance of the concave lens at d line;
v(1): Abbe number of the convex lens at d line;
v(2): Abbe number of the concave lens at d line;
S: distance from the lens to the focal point.

Under the condition, since f(1) is larger than 0 and f(2) is smaller than 0, v(1) should be set smaller and v(2) should be set larger so as to increase the axial chromatic aberration. In other words, it should be so set to satisfy the condition of v(2) being equal to or larger than v(1). The parameters of the coupling lens satisfying this condition will be tabulated below.

TABLE 2

| convex lens | $r_1 = 10.739$<br>$r_2 = -7.741$ | $d_1 = 2$<br>$d_2 = 0$ | For SF10 glass material<br>nd = 1.72825<br>vd = 28.3 |
|---|---|---|---|
| concave lens | $r_3 = -7.741$<br>$r_4 = -53.619$ | $d_3 = 2.2$ | For NbSF10 glass material<br>nd = 1.83400<br>vd = 373 |

The focal distance for a laser beam having the wavelength lambda$_0$=780 nm emitted at the reference ambient temperature is $f_{780}=15.0076$ and the focal distance for a laser beam having the wavelength lambda$_1$= 787.5 nm emitted at the ambient temperature higher than the reference temperature by 30 degrees is $f_{787.5}=15.0180$. Thus, the axial chromatic aberration of the two-part lens is delta S=delta f=10.4 microns.

As a comparison, for the coupling lens having the values shown in table 1, the difference delta P in the distance between the coupling lens and the laser beam emitting point of the semiconductor laser before and after the ambient temperature change of 30 degrees is delta P=delta 1—delta $f=10.35-1.5=8.85$ microns. On the other hand, in the case of the coupling lens having the values shown in table 2, delta P=delta 1—delta $f=10.35-10.4=0.05$ microns, which is significantly smaller than the previous result of 8.85 microns. This indicates the fact that the laser beam passing through the coupling lens remains substantially at constant and unchanged even if the ambient temperature changes when use is made of the coupling lens having the values shown in table 2.

Now, the provision of axial chromatic aberration to the coupling lens in accordance with this aspect of the present invention such that the change in the distance between the semiconductor laser and the coupling lens due to thermal deformation of the support member caused by a deviation in the ambient temperature from the reference condition substantially cancels the change in the focal distance of the coupling lens due to a change in a laser beam emitted from the semiconductor laser caused by the ambient temperature change indicates that the axial chromatic aberration is provided so as to appropriately compensate the optical condition brought about by the change in focal distance, delta f, and the other optical condition brought about by the change in distance between the coupling lens and the laser, delta 1. Thus, a consideration will now be given to the rule of thumb regarding the level of the axial chromatic aberration to be provided to the coupling lens.

For example, in an optical pick-up device, due to the difference, delta P (=delta 1—delta f), in distance between the laser beam emitting point of the semiconductor laser and the focal point of the coupling lens depending on a change in the ambient temperature, there is produced an error, delta $f_0$, in the focus error detecting function of the detecting optical system of the optical pick-up device, and such an error can be expressed in the following equation (2).

$$\text{delta } f_0 = \frac{1}{2} (f_{OBJ}/f_{CL})^2 \text{ delta } P \quad (2)$$

Here,
$f_{OBJ}$: focal distance of the objective lens;
$f_{CL}$: focal distance of the coupling lens.

Under the condition, supposing that, as a common optical pick-up device, use is made of $f_{CL}=15$ mm and $f_{OBJ}=4.5$ mm and $\pm 0.2$ microns is required as the allowable focal point detection error range, then the allowable limit of delta P can be calculated by abs(delta P) being equal to or smaller than $2(f_{CL}/f_{OBJ})^2$.delta $f_0=2$ $(15/4.5)^2 \times (0.2)=4.4$ microns. Thus, in the present example, since the change in distance between the laser and the coupling lens due to a change in the support member when the ambient temperature changes by 30 degrees from the reference temperature, i.e., delta 1, is equal to 10.35 microns, the axial chromatic aberration of the coupling lens, i.e., delta S (=delta f), can be set in a range of 5.95 to 14.75 microns.

Figure 8:
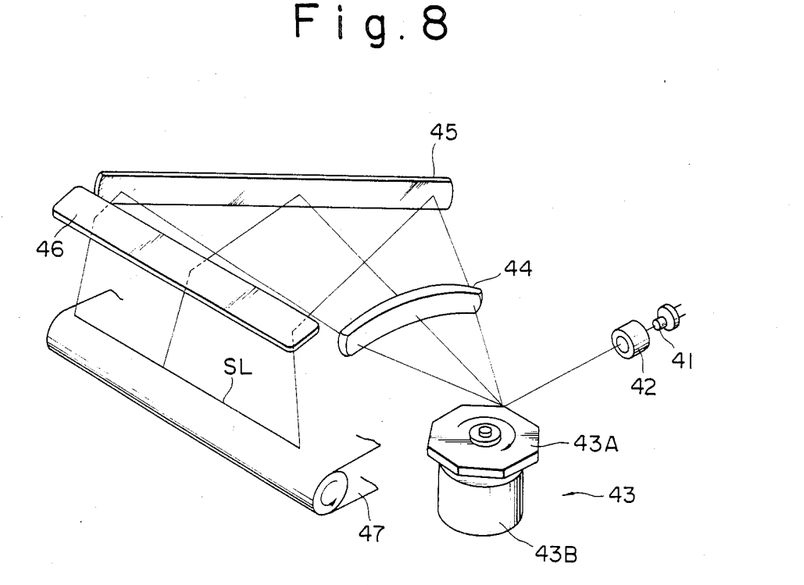
FIG. 8 is a schematic illustration in perspective showing a laser printer which incorporates a semiconductor laser unit constructed in accordance with another embodiment of the present invention.

Next, another consideration will be given to the allowable limit of delta P for the case in which the semiconductor laser unit of FIG. 9 is used in the laser printer shown in FIG. 8. For better understanding, it will first be explained the overall structure of the laser printer shown in FIG. 8. As shown in FIG. 8, a laser beam emitted from a semiconductor laser 41 passes through a collimator lens 42, serving as the coupling lens, whereby the laser beam is collimated. The thus collimated laser beam is then incident upon a rotating polygon mirror 43A, defining a part of a scanner 43, so that the incident laser beam is reflected toward and passes through a f$\theta$ lens 44, flat mirrors 45 and 46 to finally reach a belt-shaped photoconductive member 48, where the laser beam is focused to define a beam spot on the photoconductive member 48 due to the function of the f$\theta$ lens 44. When the polygon mirror 43A is driven to rotate by a motor 43B, the beam spot moves along a hypothetical scanning line SL at constant speed, thereby carrying out scanning of the photoconductive member 47. Under the condition, if the photoconductive member 47 is driven to travel at constant speed, for example, by causing one of rollers between which the belt 47 is extended to be driven to rotate as indicated by the arrow in FIG. 8 while modulating the laser beam emitted from the laser 41 in accordance with an image signal supplied thereto, an electrostatic latent image is formed on the photoconductive belt 47 in accordance with the image signal. In this case, of course, the belt 47 must be first charged uniformly by a well-known means, such as a corona charging device (not shown). In this case, it is also assumed that the dot density of optical scanning is set at 400 dots/inch. Thus, the size of the beam spot is approximately 80 microns and the depth of the beam is approximately 2 mm.

Under this condition, denoting the focal distance of the $f\theta$ lens 44 by $f_F$, the allowable limit of delta P which is the difference in the distance between the laser and the coupling lens before and after the change in the ambient temperature in the present optical system can be given by abs(delta P) being equal to or smaller than $(f_{CL}/f_F)^2 \times$(depth of beam). Assuming that $f_{CL}=15$ mm, $f_F=500$ mm and depth of beam=2 mm, then we obtain abs(delta P) being equal to or smaller than $(15/500)^2 \times 2 = 1.8$ microns. Accordingly, in the case where the change in distance between the semiconductor laser and the coupling lens, i.e., delta 1=10.35 microns, the axial chromatic aberration of the coupling lens, i.e., delta S (=delta f) may be set in a range from 8.55 to 12.15 microns.

In general, designating that
delta T: change of ambient temperature
alpha: linear expansion coefficient of support member
$f_{CL}$: focal distance of coupling lens
$f_F$: focal distance of $f\theta$ lens
delta B: depth of beam on photoconductive member
delta S (=delta f): axial chromatic aberration of coupling lens with ambient temperature at delta T
beta: temperature dependency of the wavelength of a laser beam emitted in terms of nm/degree, it is only necessary to satisfy the condition of:

abs(delta S−alpha.$f_{CL}$.delta T) being equal to or less than $(f_{CL}/f_F)^2 \times$ delta B, where, delta S is an axial chromatic aberration corresponding to wavelength shift beta×delta T (nm) of the laser beam and abs indicates an absolute value of the value in the brackets.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A laser beam collimating device comprising:
   a semiconductor laser for emitting a laser beam;
   a coupling lens located in front of said laser for receiving and passing said laser beam therethrough, said coupling lens including a plurality of lens elements; and
   supporting means for supporting said laser and said coupling lens;
   wherein:
   (i) the wavelength of said laser changes as a function of ambient temperature, and said supporting means deforms as a function of ambient temperature to thereby change the distance between said laser and said lens; and
   (ii) said coupling lens is provided with a predetermined axial chromatic aberration to change its focal distance as a function of wavelength such that the change in the focal distance of said coupling lens resulting from a change in wavelength of said laser beam emitted from said laser due to a change in ambient temperature is substantially equal to the change in the distance between said laser and said coupling lens resulting from thermal deformation of said supporting means due to said change in ambient temperature.

2. Device of claim 1 wherein said coupling lens is a collimator lens and axially aligned with respect to the laser beam emitted from said laser.

3. Device of claim 2 wherein said laser beam passing through said coupling lens substantially remains in a collimated condition irrespective of said change in ambient temperature.

4. Device of claim 1 further comprising:
   a beam splitter for allowing said laser beam from said coupling lens to pass therethrough;
   a quarter wavelength plate for allowing said laser beam from said beam splitter to pass therethrough;
   an objective lens for receiving said laser beam from said quarter wavelength plate and causing said laser beam to be focused on a recording medium in the form of a beam spot;
   a focusing lens for receiving a reflecting beam reflecting from said recording medium and from said beam splitter after passing through said quarter wavelength plate and for focusing said reflecting beam onto a focal point thereof; and
   focusing error detecting means disposed at said focal point of said focusing lens for receiving at least a part of said reflecting beam from said focusing lens.

5. Device of claim 4 further comprising tracking error detecting means interposed between said focusing lens and said focusing error detecting means for intercepting a part of said reflecting beam from said focusing lens.

6. Device of claim 4 wherein said coupling lens satisfies the condition of abs(delta $f_c$−delta T×beta×L) being smaller than $0.4 \times (f_c/f_0)^2 \times 10^{-3}$, where
   delta $f_c$: amount of change of focal distance of the coupling lens resulting from a change in wavelength of the laser beam emitted from the laser due to a change in ambient temperature;
   delta T: amount of change in ambient temperature;
   beta: linear expansion coefficient of the supporting means;
   L: distance between the laser and the coupling lens;
   $f_c$: focal distance of the coupling lens; and
   $f_0$: focal distance of the objective lens.

7. Device of claim 1 wherein said supporting means is generally cylindrical in shape having a first end where said semiconductor laser is located and a second end, opposite to said first end, where said coupling lens is located.

8. Device of claim 7 further comprising a holder attached to the first end of said supporting means by means of screws and said semiconductor laser is mounted on said holder by means of screws.

9. Device of claim 8 wherein said holder is in the shape of a plate and provided with a center hole through which the laser beam emitted from said laser is directed toward said coupling lens.

10. Device of claim 7 further comprising a cell unit for housing therein said coupling lens, said cell unit being housed in and fixedly attached by means of at least one screw to said supporting means at the second end thereof.

11. Device of claim 1 wherein said coupling lens is a two-component lens comprised of a convex lens and a concave lens.

12. Device of claim 1 further comprising:
deflecting means for deflecting said laser beam from said coupling lens over a predetermined angle; and
a fθ lens for receiving and focusing the laser beam deflected by said deflecting means onto a point in a scanning line where an imaging member is located, whereby the laser beam focused on the imaging member is scanned along said scanning line as the laser beam is deflected by said deflecting means over said predetermined angle.

13. Device of claim 12 wherein a condition of abs(-delta S—alpha.$f_{CL}$.delta T) being equal to or less than $(f_{CL}/f_F)^2 \times$ delta B holds true, in which
delta T: change of ambient temperature;
alpha: linear expansion coefficient of the support member;
$f_{CL}$: focal distance of the coupling lens;
$f_F$: focal distance of the fθ lens;
delta B: field depth of the laser beam on the imaging member;
delta S: axial chromatic aberration of the coupling lens with ambient temperature at delta T; and
beta: temperature dependency of the wavelength of the laser beam emitted from the laser.

14. Device of claim 1 wherein said coupling lens includes two lens elements.

15. Device of claim 14 wherein one of said lens elements is a convex lens having a first Abbe number and the other is a concave lens having a second Abbe number, wherein said first Abbe number is not larger than said second Abbe number.

16. Device of claim 15 wherein said convex and concave lens elements are cemented together.

17. Device of claim 14 wherein said convex and concave lenses have the following parameters:

| convex lens | $r_1 = 10.739$ $r_2 = -7.741$ | $d_1 = 2$ $d_2 = 0$ | For SF10 glass material $n_d = 1.72825$ $\nu_d = 28.3$ |
|---|---|---|---|
| concave lens | $r_3 = -7.741$ $r_4 = -53.619$ | $d_3 = 2.2$ | For NbSF10 glass material $n_d = 1.83400$ $\nu_d = 373.$ |

* * * * *